Aug. 14, 1962 J. D. GRIGSBY ETAL 3,048,979
BRAKE SYSTEM WITH ELECTRO-HYDRAULIC UNIT
Filed June 30, 1960 4 Sheets-Sheet 1

Inventors
John D. Grigsby
James R. Jeromson Jr.
by Hill, Sherman, Meroni, Gross & Simpson Attys.

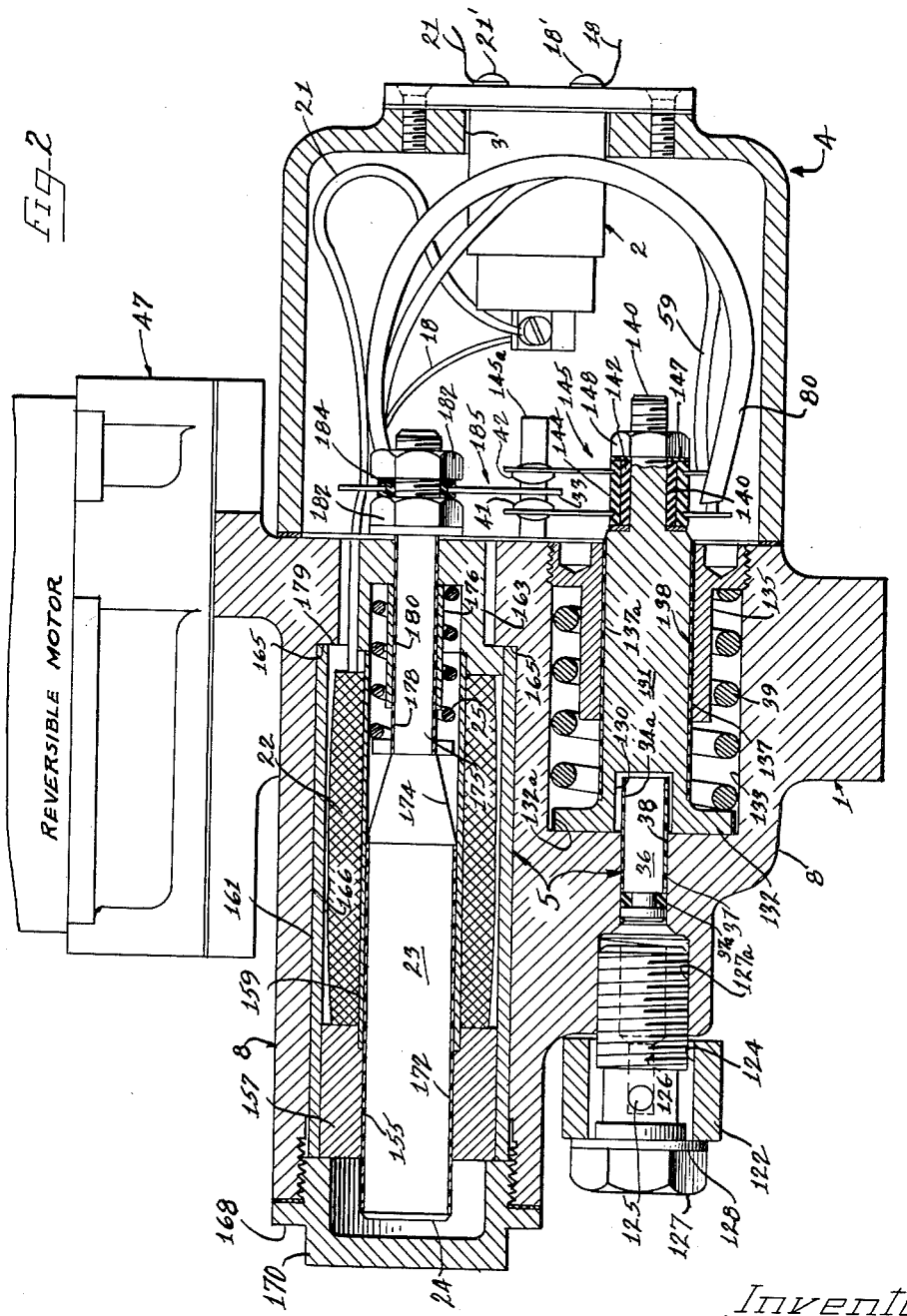

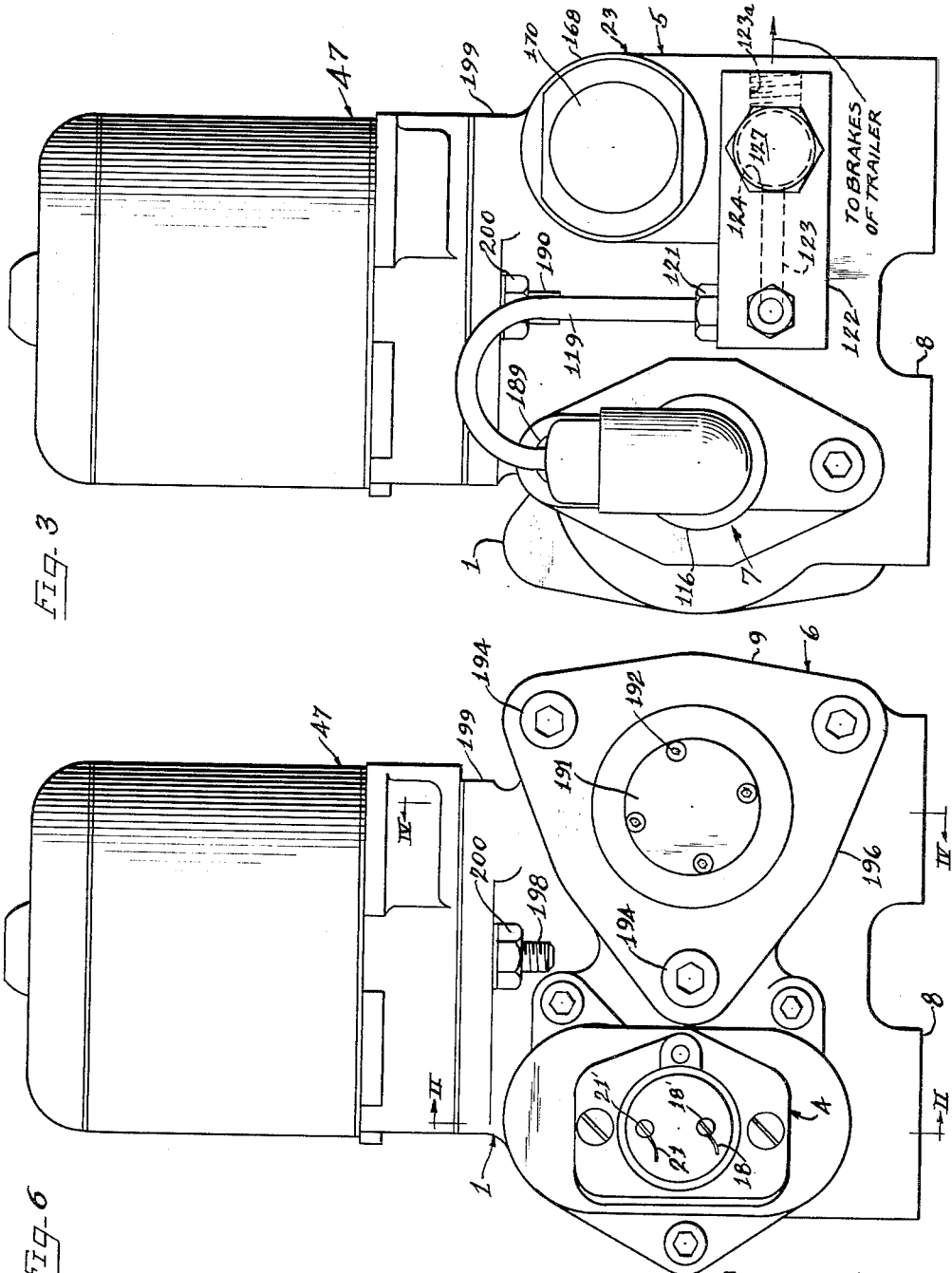

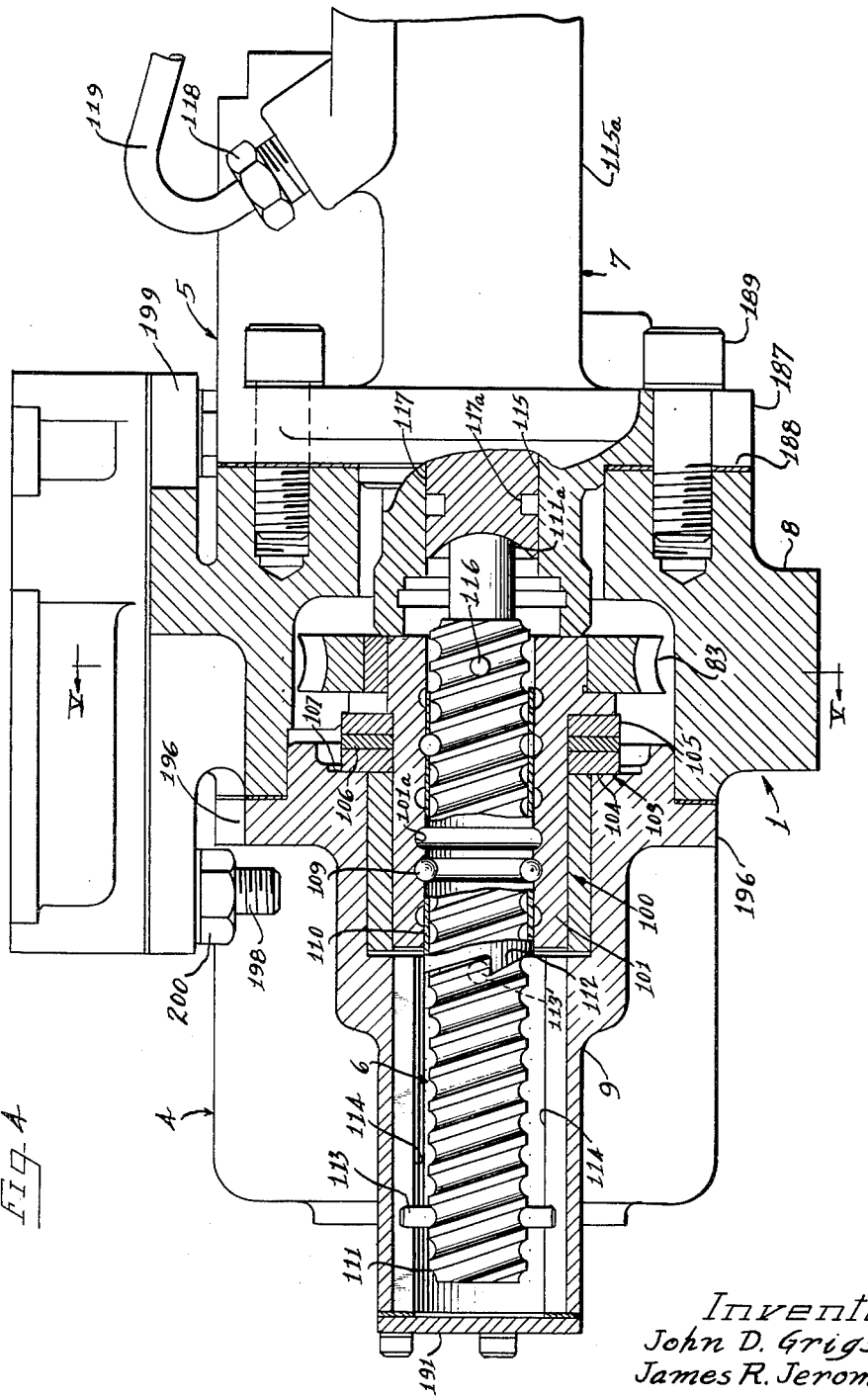

United States Patent Office 3,048,979
Patented Aug. 14, 1962

3,048,979
BRAKE SYSTEM WITH ELECTRO-HYDRAULIC UNIT
John D. Grigsby, Willoughby, and James R. Jeromson, Jr., Willoughby Hills, Ohio, assignors to Thompson Ramo Wooldridge Inc., Cleveland, Ohio, a corporation of Ohio
Filed June 30, 1960, Ser. No. 39,843
9 Claims. (Cl. 60—54.6)

This invention relates to electrically actuated and controlled hydraulic brake systems for remote manual (and preferably position responsive) control in applications such as trailers. It includes improvements over our co-pending application S.N. 756,881 filed August 25, 1958 for "Brake Control System."

This invention also relates to a compact unit or unitary assembly of (preferably all of) the interacting electric, hydraulic, and mechanical components to supply desired modulated hydraulic pressures at a remote point, such as a trailer, as for actuation of its brakes.

According to this invention and as features hereof, such systems, and particularly systems employing a reversible electric motor to actuate the pressure supplying master cylinder in either direction, are simplified and improved by cooperating features including the elimination of relays or the like in the on-off and reversing actuation of the electric motor, the elimination of limit switches or the like by excess end travel responsive controlled frictional slip means preferably for both ends of the linear piston travel and as a part of the linear actuator, and the elimination of a separate brake or the like to hold the linear actuator and the hydraulic pressure producing piston of the master cylinder in a desired position in an efficient system preferably including inertia overrun in either direction of motion to open the motor energizing contacts and also preferably in a system whose resulting pressures are a function of the position of a remote manual control member.

Another aspect of this invention is the provision, for use in such hydraulic systems, of a unitary assembly or compact unit device to embody therein substantially all, or most of, the electrical, hydraulic, and mechanical parts carried at the remote point, such as a trailer, and necessary to supply the remotely energized and the remotely controlled or variably selected values of hydraulic pressure. Preferably, such unitary assembly includes (in a desirable arrangement as hereinafter described) a reversible electric motor, a gear reduction therefor, a connected linear actuator and hydraulic pressure supplying master cylinder unit, and inter-related electrical and hydraulic control means responsive to a remote and operator varied rheostat control in the driver's cab by which the hydraulic pressure may be variably adjusted from the fully-off condition through a wide range of values to the fully-on condition.

It is therefore a general object of this invention to provide such a remotely electrically energized and remotely electrically controlled system to supply selectively or manually controlled hydraulic pressures which is improved and simplified, and particularly in such systems using a reversible D.C. electric motor under a remote and reversing on-off control without requiring any relays or the like.

A further object of this invention is the provision of such a hydraulic system wherein the preferably reversible electric motor drives the master cylinder through a linear actuator with controlled slip means to prevent harmful overtravel thereof, preferably in either direction, thus eliminating the need for limit switches.

Another object hereof is the provision of such a system simplified by an irreversible gear reduction between the motor and the linear actuator to eliminate the need for any additional brake to hold the actuator and master piston in any desired position under a remote position responsive manual control but permitting the use of inertia overrun of the motor in either direction to open its energizing switches.

Still another object hereof is the provision in such a system of a simplified, compact and unitary assembly of preferably all of the remote or trailer carried electric, hydraulic, and mechanical components to provide the desired hydraulic pressures by a lower cost and lower maintenance combination of the several interacting parts.

Other objects, features, and advantages of the present invention will be more fully apparent from the following detailed description taken in conjunction with the accompanying drawings in which like reference characters refer to like parts throughout and wherein;

FIGURE 2 shows the unit of this invention as a section taken on the lines of II—II of FIGURE 6, and with the motor being broken away, certain parts being shown in full, and others schematically;

FIGURE 3 is an elevational view to a reduced scale looking at the right hand end of FIGURE 4;

FIGURE 4 is a sectional view taken on the lines IV—IV of FIGURE 6, with parts thereof being shown in full;

FIGURE 6 is a reduced scale, elevational view looking at the right side of FIGURE 2.

Figure 1:
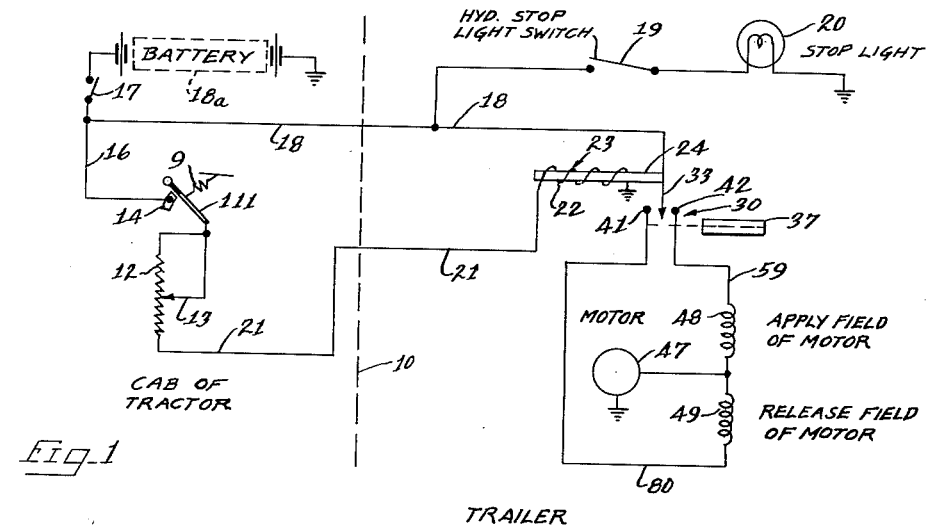
FIGURE 1 is a schematic electrical circuit diagram of a brake control system in which the present electrohydraulic unit may be employed, certain inter-related and mechanical parts being shown schematically.

Referring to the drawings and particularly to the schematic electrical circuit diagram of FIGURE 1 taken in connection with the electrical and hydraulic operating portions of FIGURE 2, the system of this invention is illustrated in a preferred or exemplary application on a trailer and to be remotely controlled by the driver from the tractor or towing vehicle. In this connection, the portion of the diagram of FIGURE 1 to the left of the dashed line 10 is intended to be illustrated as being conveniently located for use by the driver in the cab of the tractor whereas the portions of this diagrammatic circuit to the right of the dashed line 10 are considered as being mounted in a suitable location on the trailer or in some other remote location wherein an electrical energization and control is desired.

The driver's control (which is not of itself a feature of the present invention) is schematically illustrated as embodying a suitably movable control arm or handle 111 which is suitably mechanically connected or ganged to the movable switch or wiper arm 13 operatively associated with the rheostat 12. As shown the switch arm 11 is arranged to close the circuit through an extended contact 14. The switch and rheostat are arranged so that the highest resistance of the rheostat is given when the switch is in the open position as shown in FIGURE 1. As the control lever comprising the switch arm 11 is moved down, the switch contact 14 is initially closed. Thereafter additional downward movement of the handle reduces the rheostat resistance as will be apparent to those skilled in this art. It will be noted that the switch cannot be reopened until the rheostat is returned to its high resistance condition. The operating lever or handle 111 is spring loaded by a suitable spring 9 connected to any suitable fixed member so that the rheostat and switch will be returned automatically to their off position when released by the driver.

Contact 14 is connected by a suitable wire 16 to a main master two-position or on-off switch 17 to one side of suitable source of D.C. voltage such as the battery 18a of the tractor vehicle. A non-modulated D.C. voltage is thus supplied through wire 18 to the remote actuating unit of the present invention, here designated as a whole by 1 and illustrated as being mounted in a suitable position on the trailer or the like.

As shown, the wire 18 may have a branch or parallel portion connected to supply the hydraulic stop light switch 19 which controls the energization of a conventional stop light 20, here indicated as conventionally grounded. It will be understood that switch 19 is actuated by any suitable or desirable hydraulic means associated with the hydraulic brake pressure from the unit 1 and to be connected to close switch 19 when the brakes are applied.

The second live wire led back from the tractor vehicle to the trailer is the lead 21 which, as illustrated, supplies the current controlled by switch 14 and having its voltage and current modulated by the rheostat 12, 13 to thus apply a variable energization to the grounded coil 22 of a control solenoid designated as a whole by 23. This control solenoid 23 and its interacting parts are shown in greater detail in FIGURE 2 and in the other figures.

Preferably this solenoid is of the traction type in which the magnetic force on the plunger is nearly or substantially constant throughout its working stroke for any particular and constant value of its coil current. It will be understood, however, that the magnetic force acting on this plunger 24 of this solenoid will increase with increasing values of its coil current, preferably in a substantially linear ratio.

As shown in FIGURE 2, this solenoid plunger 24 is biased in opposition to the magnetic forces of its coil 22 by a suitable and preferably linear rate spring means such as the compression spring 25, which is hereafter described in more detail.

Thus it will be apparent to those skilled in this art that the combined spring and solenoid means disclosed here provides for an infinite number of positions of the plunger 24, each position corresponding to one position of the control handle 11 or the wiper arm 13 relative to the rheostat 12. Preferably (but not necessarily within the broader purview of this invention) the several positions of the plunger 24 are linear with respect to the differing values of current supplied through line 21 and also with respect to the distances moved by the arm 13 on the rheostat 12. It will also be understood that each such position is an equilibrium condition and that upon changing position of wiper arm 13, the plunger 24 will move to a new equilibrium position under the magnetically produced force of the coil 22 due to the different current therein (this force being preferably constant throughout the working travel of the plunger in our preferred embodiment) and the contra-biasing action of the preferably linear rate spring 25 as described above. It will also be apparent that the magnitude of the force seeking to return the plunger to its new equilibrium position will be greater in linear proportion to the distance that the plunger has to move to its new equilibrium position. Thus, this force will be quite small when the plunger has only a small travel to make or when it is quite close to its final equilibrium position.

As illustrated, line 18 energizes a differential switch means designated as a whole by 30 which controls the forward and the reverse actuation of motor 47, all as hereinafter described in more detail.

It will thus be apparent that it is desirable, under this invention, to have two different wires leading from the driver's cab of the tractor or the like and to the unit 1. As described above, these two lines or wires comprise the steady voltage or on-off line 18 controlled by switch 17 and actuating the differential switch means 30. The second line or wire carries the modulated current which is varied as disclosed above by the variable rheostat 12, 13. It will be understood that these two wires may be in a suitable and durable type of cable for trailer service or the like, including the usual detachable connections. It is also to be understood that a suitable ground connection wire (not shown) may be carried back from unit 1 (and the portions thereof which are indicated as grounded in FIGURE 1) to the grounded side of the battery 18a in those cases where a sufficient ground connection is not otherwise provided in the remote installation.

The above described characteristics of solenoid 23 and its biasing spring 25 are described in more detail, and illustrated in the graph or diagram of FIGURE 3 of our above referred to "Brake Control System," Serial No. 756,881.

As shown in FIG. 2, the trailer end portions of leads 18 and 21 are shown as being conventionally or suitably connected to unit 1 as by the screw type connectors 18' and 21' respectively. These connectors are on the outer side of a suitable or conventional type of removable connecting plug designated as a whole by 2 and shaped to match and fit into the corresponding socket 3 of the wiring housing receptacle portion 4 of unit 1, as shown in FIGURES 2 and 3. These wires 18 and 21 are shown in FIGURE 2 as leading to the movable contact 33 and to the solenoid coil 22 respectively. It will be noted that the movable contact 33 is carried by, and moves with, the solenoid plunger 23.

The solenoid and its contact 33 cooperates with the hydraulic pressure sensing unit 36 whose piston 37 carries the movable and spaced apart pair of contacts 41 and 42 to actuate the reversible motor 47 in its pressure releasing direction and in its pressure applying direction respectively.

As shown, these two hydraulically actuated contacts 41 and 42 are spaced apart axially a distance slightly greater than the axial thickness of contact 33 to thus provide a clearance which is important in permitting an open switch condition by inertia overrun as hereinafter described. The contact 33 is thus embraced between the two hydraulically actuated contacts so that it may engage either (or be out of engagement with either) of the two embracing contacts. It is to be noted that the motion of the solenoid and its contact 33 under increasing values of current (given by cutting out resistance at the rheostat 12) is in the same direction as that of the solenoid plunger with its two contacts 41 and 42 under increasing values of the hydraulic brake pressure. Thus the suitable action of the motor to increase or reduce the hydraulic pressure causes the sensing piston 37 and its contacts to take up positions substantially corresponding to the current controlled positions of the solenoid 23, all as will be understood by those skilled in this art.

It will be noted that piston 37 is axially slidable in a bore 38 and that it is spring loaded or biased in the reverse direction by the larger diameter, compression spring 39.

As indicated in the circuit diagram of FIGURE 1 the intermittent duty, reversible type, D.C. motor 47 is preferably reversed by means of two selectively energized field coils 48 and 49 to actuate it in the pressure applying and in the pressure reducing directions respectively under the control of the contacts 42 and 41 respectively as noted above. As shown, contact 42 is connected to applying field coil 48 by lead 59 and releasing field coil 49 is connected to contact 41 by the lead 80, both of which are also shown in the wiring and plug holding housing 4 of FIGURE 2 which housing is of an elongated, rounded shape as shown and extends alongside of unit 6.

It will be noted that the compact and advantageous arrangement of this assembly unit 1 comprises broadly the four main operating units, consisting of the wiring and plug housing designated as a whole by 4, the axially extending and two layer or parallel cylindrical units 23 and 36 of the solenoid unit and the pressure sensing unit, both being designated as a whole by 5, the linear actuator or the ball-nut screw shaft unit designated as a whole by 6 and the hydraulic master cylinder unit designated as a whole by 7. As shown, these four units or main operating components have parallel axes in this assembly and their axes extend transverse to the axis of the motor 47. All of them are assembled together in a common or single unit assembly 1 by means of a main or center section 8 which also forms the gear housing, all as hereinafter described in more detail.

Figure 5:
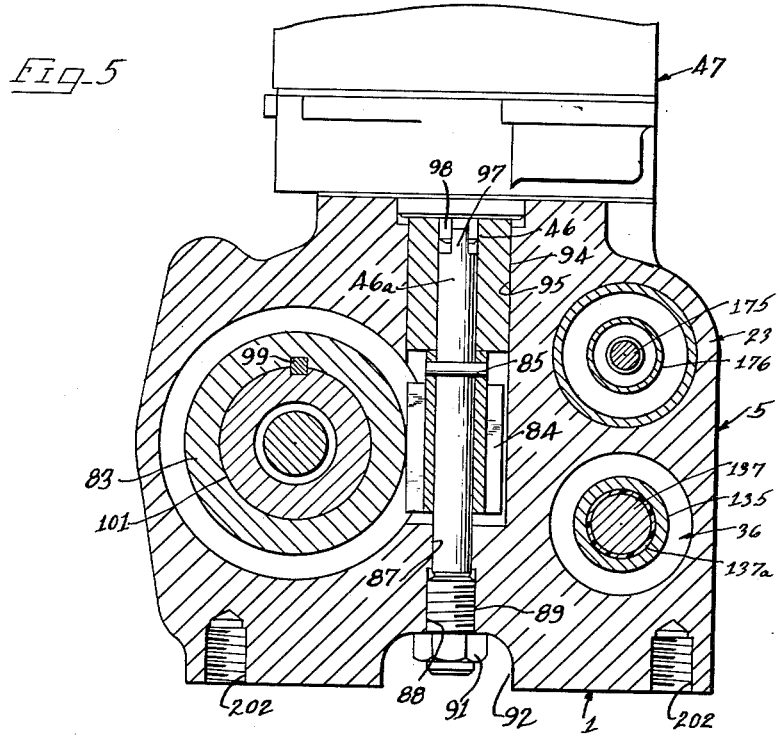
FIGURE 5 is a reduced scale sectional view taken on the line V—V of FIGURE 4, with the motor broken away.

The motor 47 has its shaft 46, extending down transverse to, and between, the spaced apart solenoid-hydraulic pressure sensing unit 5 and the worm gear 83 of the unit 6, as best shown in FIGURE 5. Worm gear 83 is driven by the offset and transversely extending worm 84 mounted on the worm shaft 46a to which it is suitably drivably connected, as by the through or roll pin 85. It will be noted that the lower end portion of this worm shaft is laterally located by, and has a journal type bearing in, the bore portion 87 of the gear housing or main or center section portion 8 which is a unitary casting of steel, aluminum, or one of the light metal alloys.

As shown, bearing bore 87 is enlarged at its lower end 88 and is threaded and extends up and through the bottom of casting 8 to receive a set screw 89 whose reduced upper end abuts against the shaft 47a and axially locates it. Screw 89 is locked in position by suitable means such as the hex nut 91 which is in a suitable recess as shown at 92.

The upper end of the worm shaft 46a has a plain or journal type bearing in the spacer bearing sleeve 94 which is suitably fixed in the enlarged bore portion 95 which is also of the proper diameter to receive the worm 84. The upper end of the worm shaft has a detachable and misalignment type of drive coupling 97 to cooperate with the matching and interengaging drive coupling means 98 on the lower end of the motor shaft 47, as best shown in FIGURE 5.

The worm gear 83 is drivingly connected, as by the key 99, to the inner end of the elongated ball nut member 101, as best seen in FIGURES 4 and 5. 101 is the outer member of the slippable planetary and screw type linear actuator unit designated as a whole by 100. This so-called nut or slippable outer planetary driving member 101 is held against axial motion by the thrust bearing unit designated as a whole by 103 and which may be of any suitable type such as the suitably mounted and connected needle type thrust bearing including the outer and inner thrust races 104 and 105 respectively and separated by the suitably retained needles 106. This bearing reacts against the stop or shoulder 107, of the separate housing casting portion designated as a whole by 9.

It will be understood that the so-called nut 101 has the annular grooves 101a and forms the outer portion of a suitable linear actuator to transform the highly geared down or reduced speed rotation of the worm gear 83 into a slow and limited travel linear motion along the axis of the gear 83. It thus gives a second mechanical advantage in series with the worm and worm gear. The linear actuator of unit 6 is preferably of the direct acting mechanical type such as the screw, planetary elements such as balls, and nut unit designated as a whole by 100. It is self-locking. That is, its internal friction holds it against rotation or motion by axial pressure on the screw.

By way of example, this unit may be either the "Roton" unit as produced by the Anderson Company of Gary, Indiana or the "BallNut" unit as produced by the Eaton Manufacturing Company of Detroit, Michigan. It may be noted that the "Roton" type of unit is described in U.S. Patent No. 2,714,005. It will be understood that these types of units, while being of the antifriction type, uses or depends on one value of friction to cause rolling of the planetary elements or balls with respect to both the outer annular grooved nut and the inner screw.

It will thus be understood that when the elements slide under a second frictional value, the unit will free wheel or slip so that rotation of the nut will cause no translation of the screw. In such units the slipping or free-wheeling is caused at a desired position by engagement between a pin and a cage carrying the balls or other suitable planetary elements.

Referring to this linear actuator structure as shown in FIGURE 4, it will be noted that the inner cylindrical bore of the nut 101 has ball engaging, annular or ring-like grooves 101a in which the balls 109 are engaged. These balls are held in holes in the cage 110. This cage sleeve 110 extends axially along the screw 111 which is correspondingly threaded to engage the inner sides of the balls. As shown, screw 111 and nut 101 are radially spaced to provide a clearance space to receive the cage sleeve 110. Screw 111 has the ends of its pin 113 engaged and slidable along in the guide slots 114, which hold the screw against rotation and permit it to have only an axial motion.

It should be mentioned at this point that the above noted free-wheeling or slippage feature of the above described slippable planetary type screw unit is particularly important in this invention and gives rise to a new and useful relationship and results since it permits the elimination of limit switches (such, for example, as are necessary and employed in our above noted "Brake Control System," Serial No. 756,881).

As an example of an instance in which damage to parts of this whole unit 1 may occur if there is no limit switch or free-wheeling means as above described, the operation of bleeding the hydraulic system is noted. During such bleeding, with the system vented to the atmosphere, no pressure is developed and the hydraulic sensing unit 36 (including its switches 41 and 42) do not shut the motor off. Thus, if the control 11 calls for current, the motor will continue to run, with the danger of resulting damage.

As best shown in FIGURE 4, a suitable stop on, and moving with, the screw 111 is provided as by the stop or through pin 113 which is positioned to have its two ends engage two suitable driving extensions 112 on the outer end of the ball cage sleeve 110 (as indicated in the dotted line showing in FIGURE 4 of the pin 113 in its position 113'). There are two similar extensions on the other end of the ball cage sleeve 110 to engage pin 116 to limit the other direction of rotation. It will be understood that they engage pins 113 and 116 respectively for opposite directions of rotation of 111 and only in one direction to permit nut 101 to rotate by a controlled slip without any linear actuation of its screw 111. This serves as a safety or limit switch type of means to prevent undesired excess travel at either end of the stroke 111. The rotating screw and pin 113 picks up and carries the cage sleeve 110 with it. This causes sliding or slippage of the balls as distinguished from their previous lower friction and rolling or planetary type of motion.

Excessive or undesired axial motion in the other direction is prevented by the similar stop pin 116 engaging the similar one way driving extensions on the other end of the cage sleeve 110.

Thus, excessive or undesired axial travel of the screw 111 in either direction is prevented by this free-wheeling action during which the worm gear and its connected nut 101 may rotate (with a frictional slippage) without causing any axial travel of screw 111. It will be understood that the frictional value at which this desired slippage occurs is selected to match, or be the greater than, the necessary axial thrust required to be produced by screw 111 for the maximum desired hydraulic pressure.

Screw 111 has at its inner end a portion 111a suitably and detachably connected to the inner end of the master cylinder piston 117, which is shown in part and as broken away in FIGURE 4.

This master piston 117 has suitable sealing means 117a and is neatly received in a bore 115 of a cylinder portion 115a. The interior of this conventional master cylinder unit, designated as a whole by 7, is not further described since it is well understood by those skilled in this art. It includes suitable discharge connections for the high pressure hydraulic liquid such as the fitting 118 and the conduit connection 119 connected by the inverted flared, Weatherhead type of fitting 121 to the upper and end portion of the fitting block 122 which has a communicating passage 123 therein which communicates by a suitable transverse passage 124 into the opening 125. This opening leads into the central bore 126 of the screwed in brake bolt 127, which has a suitable gasket 128 to seal it.

The master cylinder unit 7 has a suitable pressure or delivery outlet to supply the several brakes of the trailer. This outlet may be by a suitable connection to the threaded end 123a of passage 123. It will be understood that the conventional trailer brakes will have the usual return springs for their operating pistons and that such a resilient return for the hydraulic liquid may be provided in any other device to be actuated by the hydraulic pressures of unit 7 hereof. Thus, the inner end of the screw 111 need have only a one-way and detachable engagement with the inner end of piston of the master cylinder unit 7.

Bolt 127 also acts to retain the fitting block 122 in its operative position and closes the outer end of the bore 127a into which it is threaded as shown in FIGURE 2. Thus, these connections provide for a communication of the master cylinder hydraulic pressure at all times to the outer end of the hydraulic sensing piston 37 of the solenoid-pressure sensing unit designated as a whole by 5.

As shown in more detail in FIGURE 2, the inner end of the plunger or piston 37 is received in, and abuts against the bottom of, a recess 130 of a larger diameter spring guide 131 whose end flanged portion 132 slides in bore 133 and engages the previously noted compression spring 39. The other end of 39 is engaged by the suitably screwed in spring retainer unit 135, which is shaped as shown and provides for adjusting the compression of the spring 39. The axially extended cylindrical portion 137 of the spring guide 131 slides in cylindrical bore 138 of the adjustably secured spring guide 135. Piston 37 may have the quad-ring 37a engaging its bore 38.

The reduced extension 140 on the inner end of 131 carries the inner insulator 142. It also carries the outer insulator 144. These insulators carry the contact assembly designated as a whole by 145 and includes the portions to which the wires 80 and 59 are connected to move therewith as shown in FIGURE 2. These connections energize the two contacts 41 and 42 respectively. These insulators and the contact assembly are held in position by suitable means such as the washer 147 and nut 148 on the threaded end of 140.

The contacts 41 and 42 are suitably guided as by two guide pins of which one is shown at 145a of FIGURE 2. These pins are on either side of the contacts and are suitably secured in the main casting or central section member 5. It will be understood that the two sets of contacts have portions extending in and out of the plane of the paper in FIGURE 2 to slidably engage, and be guided by the two spaced apart guide pins 145a. Movable contact 33 may be similarly guided by pins 145a.

The solenoid, designated as a whole by 23, has its axially movable plunger 24 slidable in a correspondingly shaped and cylindrical bore 155. The travel of plunger 24 is always a function of, and gives a measure of, the current in coil 22, which is in turn a function of the position of the wiper arm 13. Preferably, but not necessarily in the broadest aspect of this invention, the position of plunger 24 is linearly proportionally related to the position of wiper arm 13 by suitable design of the magnetic path of the solenoid as will be understood by those skilled in this art.

Bore 155 extends through annular member 157 forming the end bobbin member for the solenoid coil 22 which is wound on the inner sleeve member 159, which forms an extension of passage 155. Coil 22 has its outer periphery contained in the coil bobbin sleeve 161, which is suitably secured or fixed to end member 157 and to the other end and coil enclosing member 163. The sleeve or outer member 161 abuts against the inner end 165 of cylindrical bore 166 and is retained therein by the threaded end enclosure 168 having the reduced diameter outer end portion 170 with wrench flats.

As shown to an exaggerated thickness at 172, the periphery of plunger 24 is covered throughout its operating or rubbing length with a thin layer of a very low coefficient of friction and self-lubricating solid resinous polymer such as "Teflon." A thin layer of such substance may be suitably applied in various ways. "Teflon" is commercially available in the form of a tape having adhesive on the inner side thereof. This tape may be thus wrapped around, and so adhered to, the plunger 24 to give a very low coefficient of friction in its sliding over the preferably brass interior of bore 155 of sleeve portion 159. It is important to note the self-lubricating and low coefficient of friction material to be used here (such as "Teflon"), rubs off to a limited extent on the dissimilar material such as the brass of bore 155 to give the effect of "Teflon" sliding on "Teflon." It is also to be noted that the values of the static and the sliding coefficients of friction of the preferred material (such as "Teflon") to be employed here are substantially the same (or nearly equal) so that there is substantially no sticking or jerkiness in starting due to a difference between static and sliding frictional values. Both the static and sliding coefficient of friction of "Teflon" are given as approximately 0.04. It will be understood that materials of the general type as described here may be employed either on the solenoid plunger, or on its guiding bore, or on both. The use of this non-jerking material with its low frictional value is important here since its small increments of motion of plunger 23 in response to small differences in the current values to thus accurately measure the value of the manually modulated current at all times and for small differences. This acts in association with the hydraulic pressure sensing contacts. It will be noted that there is much more energy available to move the hydraulically actuated plunger or piston 37, which is also lubricated by its hydraulic liquid. Thus it does not have the same tendency to stick or be jerky in its action as the solenoid unit 23 if it were not coated according to this invention. However, it is to be understood that the relatively sliding portions of this hydraulic pressure sensing unit may also be "Teflon" coated as indicated at 34a, 132a, and 137a.

As best shown in FIGURE 2, the solenoid plunger 24 has the tapered portion 174 connecting it to the reduced diameter extension portion 175, which is preferably integral therewith and slidable in the solenoid stop sleeve 176. This sleeve may be arranged to cooperate with closure 163 to provide a stop for the travel of the solenoid plunger 24. The other stop may be formed by 168. Extension 175 is also slidable in a reduced diameter bore 178. It is also to be understood that extension 175 or its guide bore may also have a "Teflon" coating or covering 180 like plunger 24.

The free end of 175 is threaded to receive means such as nuts 182, to retain an insulator 184 which, in turn, carries the contact assembly 185. This assembly includes the solenoid moved contact 33 which is operatively connected to the movable end of wire 21.

Referring again to the master cylinder unit 7, as seen in FIGURES 3 and 4, it is to be noted that this unit is preferably a separate casting and detachable for ease of service and replacement. This detachability also permits the use of a standard or conventional unit at this point. As shown in FIGURE 4, casting 7 has flange 187 to match a corresponding mounting face 188 on the main or central casting 8 to which it is secured by suitable means such as the two machine screws 189. These screws are engaged in correspondingly threaded sockets in casting 8.

As shown in FIGURES 3 and 4, the generally cylindrical casting 9 for the linear actuator 6 has a removable outer end closure 191, retained as by the four machine screws 192. Casting 9 is removable as a whole and is secured to the center section casting 8 by the three machine screws 194 extending through the flange 196 thereof and engaging in correspondingly threaded recesses in the center section 8.

A removably mounted unit including the motor and its casing attachment portions, which are designated as a whole by 47, carries suitable attachment means such as the threaded studs 198 to extend through corresponding holes in the flange portion 188 of the center casting section 8, and to be retained by nuts 200. These retaining means cooperate with detachable drive means 97, 98 to provide for ready removal or assembly of the motor unit 47. It will be noted that all of the removable casing or cover parts may have gaskets as shown to make the unit weather and water proof.

Referring to the system as a whole and its operation, it will be seen that the differentially moving switch unit has its interacting switches 33 and 41, 42 directly connected respectively to the forward and reverse field coils 48 and 49 of the motor 47. This direct connection, not requiring any relays or the like, for the switching control of the on-off and reversing energization of the motor 47, is due to the low current values required by the motor resulting from the low power required by the present compact actuator. The gear reduction unit provided by the worm 84 and worm gear 83 is irreversible to provide the useful braking function which holds the driven parts (including the linear actuator and the piston 113 of the master cylinder) in any selected position until the control lever 11 is moved to a new position. This braking or locking feature cooperates with, and acts only after, the inertia overrun of all of the drivingly interconnected moving parts (from the motor through to the piston 113) has carried the switch contacts into their intermediate and open position after each actuation. This overrun and contact opening feature is important in increasing the durability and life of the switch contacts and in eliminating the need for more complex snap action means or the like to assure a sufficiently rapid and complete breaking of the contacts at the end of each actuation. It will be apparent that the same action, in a reverse direction, produces a rapid make of the contacts when the handle lever 11 is moved to produce a new actuation. It will also be apparent that the above brake function and the overrun action cooperate with the above described excess travel preventing means, which eliminates the necessity for the cost and the complexity of limit switches or the like.

The main inner casting 8 may have integral means, such as the threaded holes 202, to rigidly secure the whole assembly unit 1 in position in the trailer or the like. The otherwise unobstructed bottom of casing portion 8 forms a flat mounting face for this purpose and which may be secured by suitable bolts or studs on to any correspondingly flat surface at its desired installation point. Preferably unit 1 is mounted in an upright position with the motor on top and so that the weight of the whole assembly is carried on its lower mounting face. It will be noted that the various removable portions or sub-units can be taken off or put back on while the main casing 8 is secured in place as described above which facilitates inspection and maintenance.

While the present system, and the unitary assembly 1 for use in such systems, has been particularly described as forming part of an electro-hydraulic brake system; yet it will be understood by those skilled in this art that this system or this unit may be usefully employed for various other purposes or in various other types of systems.

As will also be obviouse to those skilled in this art, there are many and various other possible changes or modifications in the structure, arrangement, proportions and in the details of the components which may be used in the practice of this invention under the teachings hereof without departing from the features and advantages hereof. The appended claims are therefore intended to embrace such changes, limited only by the spirit and scope of this invention.

We claim as our invention:

1. A unitary and compact electro-hydraulic device to supply hydraulic pressures to brakes comprising an electric motor having a shaft, an adjacent coaxial worm driven thereby and engaging a worm gear having an axial opening therethrough, a screw and slippable planetary type linear actuator at least partly in said opening, driven by said worm gear and coaxially connected to a piston in an hydraulic brake pressure supplying cylinder mounted transverse to said shaft, and electric motor control means including switch means adjacent to and connected to said piston to have a part thereof movable in response to said hydraulic pressures, said control means also including means to relatively move a part of said switch means in response to values of the motor current.

2. An electro-hydraulic unit comprising remote means to supply a controlling current value, a reversible electric motor having a shaft, a closely adjacent coaxial worm directly driven thereby and normally irreversibly driving a worm gear having an axial opening therethrough, a screw slippable type of linear actuator extending through said opening and directly driven by said worm gear in either direction by said reversible motor, an hydraulic pressure supplying piston in a cylinder coaxial with said actuator and transverse to said shaft and on the other side of said shaft from said actuator, said piston being directly connected to said linear actuator and means located along side of said cylinder, operatively connected to control said motor and responsive to said hydraulic pressure and to said remotely supplied current value to match the resulting pressure to the said current value, said pressure being supplied by rotation of said reversible motor and corresponding linear motions of said piston in either direction, said normally irreversible worm and worm gear holding said piston position and hydraulic pressure between changes in said remotely supplied current value.

3. A remote controlled hydraulic pressure supplying system comprising electric powered means to supply different values of hydraulic pressures, remote manually controlled means to supply different values of a current, and electric power controlling means including a member moved by said current and an interacting member moved by said resulting hydraulic pressures, to sensitively match said resulting pressure to said remotely controlled current, said member moved by said current having stator guide surfaces cooperating with guide surfaces thereon and means to provide a low friction having substantially the same values of static and dynamic friction between said guide surfaces for said member moved by said current, said interacting member moved by said hydraulic pressures having stator guide surfaces cooperating with guide surfaces thereon and means to provide a low friction having substantially the same values of static and dynamic friction between said guide surfaces for said member moved by said hydraulic pressures.

4. A remotely controlled electro-hydraulic brake system comprising a reversible electric motor having a shaft, a worm on said motor shaft, a worm gear driven thereby, a linear actuator unit connected coaxially with, and directly driven by, said worm gear, an hydraulic brake pressure producing master cylinder having a piston directly connected to said linear actuator, connection means to receive motor energizing currents and motor controlling control varied currents, and motor controlling and moving switch means relatively movable in response to said motor controlling varied currents and said hydraulic pressures to actuate said motor in either direction to supply higher or lower desired values of hydraulic pressures and brake means to hold the piston of said master cylinder and its selected pressure substantially constant until a different value of said control current is supplied, said brake means being provided by said worm and worm gear being normally substantially irreversible.

5. An electro-hydraulic system for remote control comprising a normally electric motor, an irreversible type gear reduction unit driven thereby, a screw and slippable planetary type linear actuator driven by said gear reduction unit, a hydraulic pressure supplying master cylinder having a piston connected to be actuated by said linear actuator, the inertia of said connected parts being greater than their friction so that said motor and said piston have an inertia overrun after the motor is deenergized, a remote movable control to supply different values of current in accordance with its different positions, and a motor controlling switch unit having relatively movable contacts connected to be moved in response to said remotely selected different values of current and by said different values of hydraulic pressure, said switch unit being connected to energize said motor when its contacts are closed and to deenergize said motor when its contacts are open, said inertia overrun and said system providing means to always move said contacts to their open position after an actuation of said motor and said irreversible gear reduction unit braking and holding the piston of said master cylinder substantially in any of its selected positions after said inertia overrun until said remote control is moved to a new position.

6. An electro-hydraulic brake system of the type described comprising an electric motor, a gear reduction, a slippable planetary cage and screw friction type of linear actuator, and an hydraulic pressure producing master cylinder having a piston, all operatively connected to produce different values of hydraulic pressure for different amounts of rotation of said motor and all providing for an inertia overrun after an actuation thereof, control means for said motor including switch means having parts relatively movable in response to said hydraulic pressures and to the values of the motor current, and means to prevent and limit excessive travel of said piston and said linear actuator comprising cage engaging stops and means in said linear actuator to produce a free-wheeling action thereof only upon excessive axial travel thereof.

7. An electro-hydraulic system for remote control and producing different hydraulic pressures corresponding to different values of a remotely varied control current supplied thereto, comprising a reversible electric motor, a gear reduction unit, a slippable planetary cage and screw type of linear actuator, and an hydraulic pressure producing master cylinder having a piston, all operatively connected to produce increased or decreased values of hydraulic pressure upon rotation of said motor in either direction and including means to maintain a selected pressure until the next remote actuation, switch means operatively connected to control said motor, said switch means controlling in accordance with the values of said varied controlled current and the corresponding values of said hydraulic pressure, remote control means connected to supply different values of said control current to said switch means, and slip means to limit the axial motion of said piston in either direction including stop means to engage said cage at either end of its desired travel.

8. An electro-hydraulic brake system for remote control and supplying hydraulic pressures for hydraulic brakes corresponding to different and remotely selected values of controlling current supplied thereto, comprising a reversible electric motor, a connected single stage gear reduction therefor comprising a motor connector worm and worm gear, a connected linear actuator comprising a rotary actuator, slippable planetary element, a cage, and screw, an hydraulic pressure for providing the master cylinder having a piston connected to be directly actuated by said linear actuator and to increase or to decrease hydraulic pressure the hydraulic pressure produced thereby upon rotation of said electric motor in one direction or the other, remote control means to supply different values of controlling electric current, a motor controlling a switch unit connected to receive said different controlling currents from said remote control means and including relatively removable means responsive to said controlling currents and to said hydraulic pressures to control said hydraulic pressures, said moving parts connected to said motor having an inertia overrun after an actuation thereof in either direction, and limited friction slip means to prevent excess axial travel of said piston including stop means.

9. An electro-hydraulic actuating system for remote control comprising a reversible electric motor, a connected gear reduction, a connected linear actuator, and a connected piston of a master cylinder supplying hydraulic pressures, a remote electric control for said motor supplying different values of selected controlling currents, a motor reversing and on-off switch unit comprising first movable switch contact means and second movable switch contact means movable independently of said first means but cooperating electrically therewith in an embracing relation to provide three switch positions of which the two end positions have the contacts engaged to energize said motor for rotation in one direction or the other and said intermediate position has the contacts open to deenergize said motor, said switch means and its contacts, being directly connected to the two fields of said motor, said switch contact means being responsive to, and movable by, said current and said hydraulic pressure to control said hydraulic pressure.

References Cited in the file of this patent

UNITED STATES PATENTS

| | | |
|---|---|---|
| 1,422,705 | Helfer | July 11, 1922 |
| 2,338,974 | Schmidt | Jan. 11, 1944 |
| 2,374,909 | Williams | May 1, 1945 |
| 2,403,092 | Lear | July 2, 1946 |
| 2,493,377 | Zeilman | Jan. 3, 1950 |
| 2,553,826 | Martin | May 22, 1951 |
| 2,677,239 | Parker | May 4, 1954 |
| 2,748,218 | Leichsenring | May 29, 1956 |
| 2,806,383 | Geyer | Sept. 17, 1957 |